(12) United States Patent
Kanai

(10) Patent No.: US 6,195,566 B1
(45) Date of Patent: *Feb. 27, 2001

(54) UTILIZATION OF INTEGRATED BASE STATIONS IN THE CELLULAR RADIO SYSTEM

(75) Inventor: Takeo Kanai, Tokyo (JP)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,779

(22) Filed: Jun. 11, 1997

(30) Foreign Application Priority Data

Jun. 13, 1996 (JP) .................................. 8-152018

(51) Int. Cl.[7] ................ H04B 1/00; H04Q 7/20
(52) U.S. Cl. ............................ 455/562; 455/443
(58) Field of Search ................ 455/73, 458, 422, 455/560, 561, 562, 443

(56) References Cited

U.S. PATENT DOCUMENTS

| | | | | |
|---|---|---|---|---|
| 5,390,366 | * | 2/1995 | Kasugai | 455/524 |
| 5,402,470 | * | 3/1995 | DeVaney | 455/422 |
| 5,425,031 | * | 6/1995 | Otsuka | 455/560 |
| 5,430,789 | * | 7/1995 | Ohgami | 455/422 |
| 5,446,370 | * | 8/1995 | Voight | 455/424 |
| 5,499,395 | * | 3/1996 | Doi et al. | 455/561 |
| 5,570,352 | * | 10/1996 | Poyhonen | 455/422 |
| 5,619,551 | * | 4/1997 | Yahagi | 455/560 |
| 5,862,492 | * | 1/1999 | Leppanen et al. | 455/422 |
| 5,913,169 | * | 2/2000 | Vaara | 455/443 |
| 6,023,459 | * | 2/2000 | Clark et al. | 455/447 |
| 6,023,625 | * | 2/2000 | Myers, Jr. | 455/503 |

* cited by examiner

Primary Examiner—Reinhard J. Eisenzopf
Assistant Examiner—Charles N. Appiah

(57) ABSTRACT

An embodiment of this invention provides a cell containing a first base station with conventional transceivers and base station facilities, and the antenna of a second base station facility; the first base station facility is made up of a group of base stations facilities where the equipment is integrated, but the second base station is a conventional local base station. A transceiver may have unused capacity and a caller with a low priority may not be assigned to the transceiver even though there is still room. This is due to the fact that the capacity is being kept available for a caller with a higher priority, since the assignments are based on priority. Traffic monitors are used by portable telephone providers to manage the traffic in every cell, so traffic can be assigned to the transceiver, based on the provider with the highest volume or according to a prearranged priority scale.

3 Claims, 2 Drawing Sheets

FIG. 2

CYCLE OF CHANNEL ASSIGNMENT

(%)

| Case<br>Location of base station | A | B | C | D | E | F |
|---|---|---|---|---|---|---|
| Terminal Station | 33 | 60 | 20 | 30 | 50 | 60 |
| Business Area | 33 | 20 | 60 | 10 | 10 | 30 |
| Residential Neighborhood | 34 | 20 | 20 | 60 | 40 | 10 |
| TOTAL | 100 | 100 | 100 | 100 | 100 | 100 |

UTILIZATION OF INTEGRATED BASE STATIONS IN THE CELLULAR RADIO SYSTEM

FIELD OF THE INVENTION

This invention relates to the connection of number local base stations distributed inside a cell with the result being an integrated base station facility.

BACKGROUND OF THE INVENTION

Recently there has been a dramatic increase in portable telephones. In addition there is a similar but scaled down portable telephone called the Personal Handy phone System (PHS). The portable telephone service area as well as the PHS system service area are somewhat limited to places like major roads, train stations, business areas, down town areas, department stores and residential areas.

Portable telephone systems (including PHS, hereafter they will be treated as the same) have a limited number of usable frequencies, since there are not an unlimited number of channels to assign to all the locations (such as roads, train station, business areas). Therefore, the cells that are controlled by base stations in areas where there is expected to be a relatively high volume of traffic are smaller, this design allows for comparatively efficient use of the various frequencies. However, in any given cell the amount the base station is utilized is obviously not fixed. For example, in business areas portable telephones are mostly used from 9:00 in the morning to 5:00 in the afternoon, but they are hardy used between 9:00 at night and 6:00 in the morning. On the other hand at a train station in a residential neighborhood, portable telephones are mostly used between 6:00 and 9:00 in the morning and between 5:00 and 9:00 at night. But at main terminals like Tokyo and Shinjuku stations portable telephones will be used throughout the day from 9:00 to 9:00.

The use of portable telephones at home is basically just for incoming calls between 6:00 in the evening to midnight, since outgoing calls are make using an ordinary phone, so it cannot be expected that portable telephones (especially for outgoing calls) will be used much in the home.

There is also the case where a special event causes a sudden demand on the system in an area where there is no need for such capacity. An example of this is the cell that contains Makuhari Messe; when there is an event going on at the Messe there is an unusually high use of portable telephones, but the problem is when there are no events there is hardly any use of portable telephones.

Therefore, the amount of traffic a base station receives depends upon changes in time and seas on. Currently, this results in the equipment of a base station being set up to accommodate the largest amount of traffic that is expected

SUMMARY OF THE INVENTION

An embodiment of the present invention pools together the equipment assigned to a given base station or a group of base stations (for example, a transceiver can be connected when traffic is heavy) making it possible to redistribute traffic to a specific base station, when it becomes necessary, thereby lightening the load on the equipment throughout the entire system.

Another embodiment of the present invention provides a cell containing a first base station with conventional transceivers and base station facilities, and the antenna of a second base station facility ; the first base station facility is made up of a group of base stations facilities where the equipment is integrated, but the second base station is a conventional local base station. If the conventional base station facilities, each of which has a transceiver, are integrated into an internally integrated base station facility, the result will be the pooling of transceivers in local base stations, which will increase the efficiency of the utilization of the equipment throughout the entire system.

Attached to a portable telephone switching station, are customer data registers, which have information pertaining to the portable telephone contract (for example, connection priority), and there is also a record of the traffic situation of each of the local base stations. This utilization information can be used, for example, in the reassignment of a transceiver of a local base station for which a monitor is indicating high usage (in other words, the integrated base station facility is the equipment and its functionality). A transceiver may have unused capacity and a caller with a low priority may not be assigned to the transceiver even though there is still room, this is due to the capacity is being kept available for a caller with a higher priority, since the assignments are based on priority.

Many providers have separate local base station facilities and are part of the jointly operated integrated base station facilities, other providers use only the jointly operated integrated base station facilities. Due to these different situations, information identifying the correct provider must be included in the customer data registers. Traffic monitors are used by the portable telephone providers to mange the traffic in every cell, so traffic can be assigned to the transceiver, based on the provider with the highest volume or according to a prearranged priority scale.

BRIEF DESCRIPTION OF THE DRAWINGS

FIG. 2 is a chart showing how this invention would assign channels according to a cycle.

(THE DEFINITION OF THE NUMBERS USED IN THE DRAWINGS)

Figure 1:
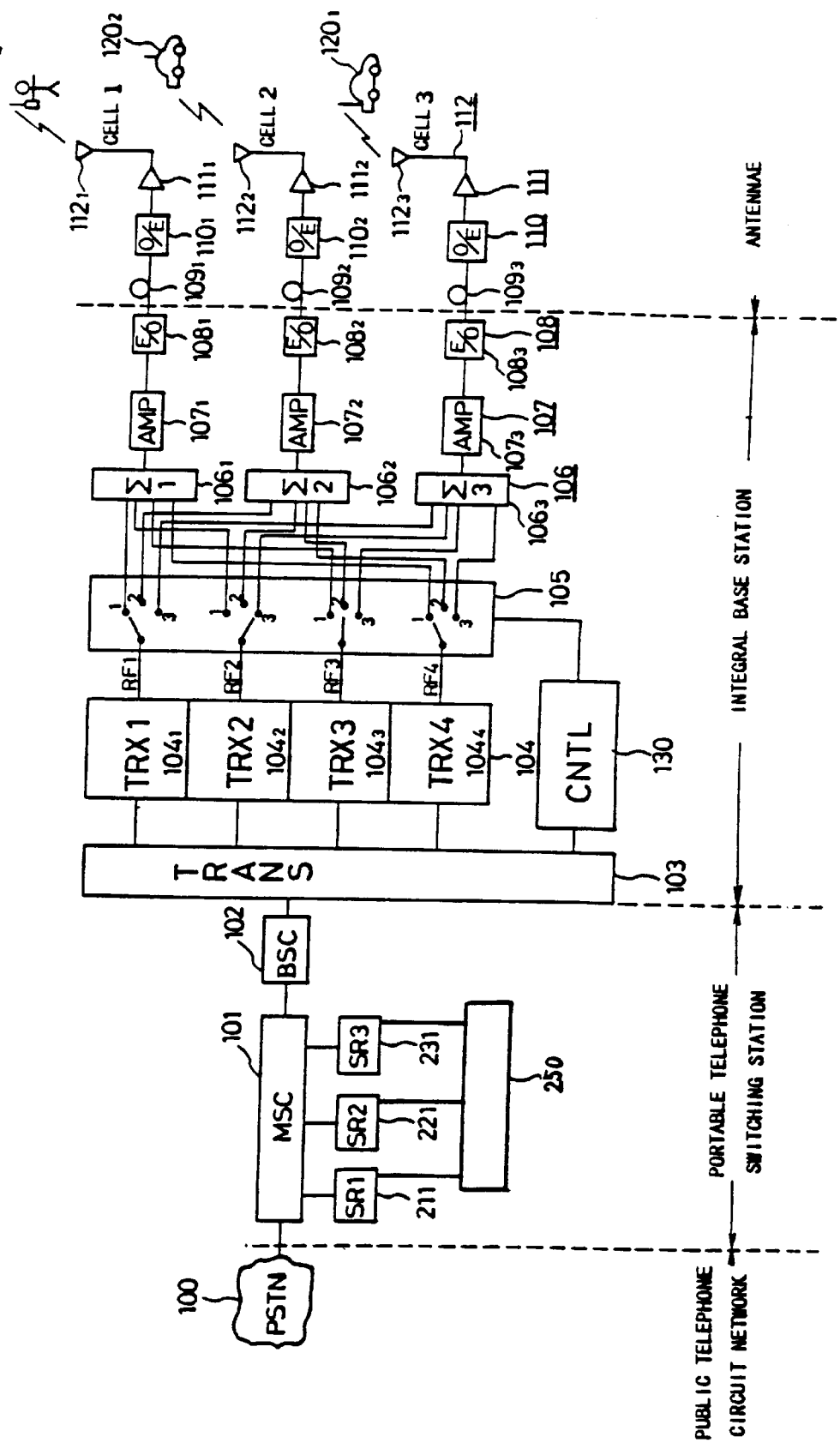
FIG. 1 is a diagram showing the architecture of an application of this invention in the cellular radio telephone system.

| | |
|---|---|
| 100 | the public switching telephone network |
| 101 | the portable telephone switching centers |
| 102 | jointly operated base station controller |
| 103 | communal transmission lines |
| 104 | communal transceiver groups |
| 105 | a switching device |
| 106 | multiplexers |
| 107, 111 | amplifiers |
| 108 | electric/optical converters |
| 109 | fiber optic cables |
| 110 | optical/electric switches |
| 112 | antennae |
| 120 | portable telephones |
| 130 | a controller |
| 211, 221, 231 | customer data registers |

DETAILED DESCRIPTION

The drawing of the structure of this invention can be divided into four main parts, the public telephone network, the portable telephone switching centers, the integrated base stations, and the numerous groups of local base stations. First, there is the public telephone circuit network, public switching telephone network (PSTN) 100, and currently PHS use NTT telephone lines and equipment. However, portable telephones do not necessarily uses NTT's network, the first communication provider is a portable telephone company with its own facilities.

Next are the portable telephone switching centers, these refer to the telephone equipment used by portable telephone providers (for example, either portable telephones or PHS); the portable telephone switching center 101 is connected to the public switching telephone network 100, also the portable telephone switching center 101 is capable of accessing the user data registers 211, 221, 231. This portable telephone switching center 101 is linked by a jointly operated base station controller 102, to the internal communal transmission lines 103 of the integrated base station facility. This public switching telephone network 100 and the switching center used by portable telephones 101 refer to facilities that currently exist. The customer data registers record in the case of completed calls the telephone number of the portable phone, for incomplete calls the present location of the phone, the class assigned to the portable telephone (priority), calls attempted by portable telephones, the type of the portable phone and the name of the portable telephone service provider. Especially the last one is important, with all the portable telephone providers using standardized equipment throughout the system, other companies leasing some circuits, and facilities that are jointly owned by companies, the name of the portable telephone provider is an important item. These registers 211, 221, 231 provide information to the traffic monitor 250 which monitors the traffic of the portable telephones. The signal from the traffic monitor 250 is sent to controller 130 via the portable telephone switching center 101, the jointly operated base station controller 102, and the communal signal lines 103.

Next an explanation of the structure of the integrated base station's equipment. The communal signal lines 103 are connected to the transceiver group 104. This group of communal transceivers 104 are linked by a switching device 105 to the multiplexers 106. This switching device 105 can connect anyone of a number of the communal transceivers in group 104 to anyone of the multiplexers 106; for example, TRX1 of communal transceiver group 104 can be switched to anyone of the multiplexers 106-1, 106-2, 106-3 of multiplexers 106. In this way other transceivers TRX2, 3, 4 can also be assigned. Although in this example one transceiver was set up that it could be switched to all of the multiplexers, it is only necessary that it be set up so that it can be connected to a few of the multiplxers. These multiplexers 106 are connected to electric/optical converters 108 by amps 107.

The controlling signal from communal signal lines 103 is sent through controller 130 to the switching device 105. Based on information which flows from the customer data registers 211, 221, 231 through the portable telephone switching center 101, the jointly operated base station controller 102, and the communal signal lines 103 to the controller, the controller controls the switching device 105. For example, according to FIG. 1 RF 1 is connected to multiplexer 106-1, RF2 to multiplexer 106-3, RF3 to multiplexer 106-2, and RF4 to multiplexer 106-1. This is a graphic result of the controller 130.

The electric/optical converts 108 are connected to the optical/electric switches 110 by fiber optic cables 109. The connection between electric/optical converters 108 and optical electric switches 110 does not necessarily have to be fiber optic cables, it could also be coaxial cables or radio connections. The amps 111 connect the optical/electric switches to the antennae 112. These optical/electrical switches, amps 111, and antennae 112 are distributed inside each base station (cell) 1, 2, 3. A cell and a base station are used interchangeably with reference to this invention. In other words, cell also refers to the equipment distributed inside the cell.

Therefore, an integrated base station facility is arranged in one location but the cells (the arrangement of local base stations) 1, 2, 3 are each in a physically separate place. Thus, the same cell with a number of directional antennae is divided up into sectors, these different sectors are subordinate to the cell. Therefore, antennae 112 inside these cells can be made up of numerous groups of antennae. What is shown here in cells 1, 2, 3 are not necessarily simple cells, these could also refer to cell group 1, cell group 2 and cell group 3. In other words a cell that is divided is a micro cell or a sector, the term used previously, and both have the same definition as that of a cell.

Next is an explanation of the operation of the radio telephone system in FIG. 1. For example, base station 2 is in a position inside the cell near the location of portable telephone 120-2 and a signal is received by the antenna 112-2. From where the signal is received it flows through the amp 111-2, optical/electric switch 110-2, fiber optic cable 109-2, electric optical converter 108-2 and amp 107-2, to multiplexer 106-2. The signal in multiplexer 106-2 will, depending on the setting of the switching device 105 go through one of the transceivers, TRX1 to TRX4, in the communal transceiver group 104, which are connected to communal signal line 103.

In the example shown in FIG. 1, the multiplexer 106-2 is connected to the communal signal line 103 by the communal transceiver group 104-3 (TRX3). The signal from the communal signal line 103 flows through the jointly operated base station controller 102 and the portable telephone switching centers 101 to the public switching telephone network 100. Usually, the public telephone network 100 handles the connection between one ordinary phone and another ordinary phone. This type of connection is what occurs except in the telephone circuit for the situation of portable phone 120-2 calling 120-1; in this case once the signal reaches portable telephone switching center 101, it is sent back to the communal signal line 103-1, communal transceiver 104-1, switching device 105-1, and multiplexer 106-1 making it possible to communicate with the portable telephone 120-1 inside of base station 3. The return communication from this phone is handled by the TRX of the communal transceiver group 104 that is connected to the multiplexer 106-3. It is in this way that communication occurs in separate base stations, inside the same base station, or with an ordinary phone.

Next, an explanation of how the switching device 105 operates with information from the controller. For example, if base station 1 is nearing the capacity of its telephone circuits, then switching device 105 must have a good number of switches in the terminal 1 position which is connected to multiplexer 106-1. Looking at FIG. 1, the channels from TRX1 and TRX4 are being connected to multiplexer 106-1 by switching device 105 having the switches in the terminal 1 position; TRX2 and TRX3 are connected to multiplexers 106-3 at terminal 3 and multiplexer 106-2 at terminal 2, respectively.

This embodiment of the invention takes the equipment of many base stations and integrates it; the integrated transceiver group can be used by a number of stations in a fixed cycle or they can be adjusted to respond to demand. The base station controller can use the transceivers for efficient distribution to the local base stations.

Integrated base stations are utilized in a cellular radio telephone system comprising a number of cells, each with local base stations, (110, 111, 112) arranged inside them. The local base stations (110, 111, 112) are being connected by a transmission medium (109) to the integrated base station's equipment (103–108), and an integral base station (103–108) is connected by the portable telephone switching center (101) to the public telephone circuit network (100). The cellular radio telephone system uses integrated base stations inside these cells to handle portable telephone customers. The integrated base stations include the portable telephone switching center (101), and associated with each cell are customer data registers (211, 221, 231) for recording information related to the customers currently using that cell. The information from these said customer data registers (211, 221, 231) is used by a traffic monitor (250) which monitors the portable telephone traffic. The integrated base station (103–108) includes the portable telephone switching center (101) which is connected to the communal signal lines (103), and the communal signal lines (103) are being connected to a number of transceivers which form a transceiver group (104). The transceiver group (104) is connected to a switching device (105), and the switching device (105) is connected to the local base stations by a number of multiplexers (106) which are used to multiplex the signal. The portable telephone switching center (101) is connected by the communal signal lines (103) to the controller (130) which is used to control the switching device (105). The controller (130) uses the information from the traffic monitor (250), and controls the switching between the multiplexers (106) and the transceivers (104).

Depending upon the traffic situation inside each cell and information on the type of service contract [when the portable telephone customers belong to the same company, this would be the service contract for the portable phones (120-1, 120-20)] which is recorded inside the portable telephone data registers (211, 221, 231), the controller (130) controls the distribution of resources to the numerous local base stations (110, 111, 112) by controlling which of the transceivers (104) operates which of the multiplexers (106).

Additionally, depending upon the traffic situation inside each cell and information on the type of service contract [when the portable telephone customers belong to different companies, this would be the service contract for every portable telephone provider] which is recorded inside the portable telephone customer data registers (211, 221, 231), the controller (130) controls the distribution of the numerous local base stations (110, 111, 112), by controlling which of the transceivers (104) operates which of the multiplexers (106).

The invention claimed is:

1. A cellular radio communication system having first and second physically separate base stations, the first base station having a first antenna in a first cell and the second base station having a second antenna in a second cell comprising:
   a third antenna coupled to the first base station and located within the second cell and a fourth antenna coupled to the second base station and located within the first cell and the first and second base stations being in communication with an integrated base station,
   the integrated base station having a plurality of transceivers and a switching means, and
   a controller coupled to control the switching means to selectively couple any one of the plurality of transceivers to any one of the base stations.

2. The cellular radio communication system of claim 1, further comprising a traffic monitor located in a portable telephone switching station remotely positioned from the base station to provide traffic information to the controller.

3. The cellular radio communication system of claim 1, further comprising a multiplexer located in the integrated base station coupled via the switching means to couple more than one of the transceivers with one of the physically separate base stations.

* * * * *